United States Patent Office 3,404,262

Patented Oct. 1, 1968

3,404,262
ELECTRIC ANALOGUE INTEGRATING AND DIFFERENTIATING CIRCUIT ARRANGEMENTS

Anthony John Shawcross Udall, Ashford, Middlesex, England, assignor to Electric & Musical Industries Limited, Middlesex, England, a company of Great Britain Filed June 11, 1964, Ser. No. 374,446
Claims priority, application Great Britain, June 14, 1963, 23,727/63
10 Claims. (Cl. 235—183)

ABSTRACT OF THE DISCLOSURE

This specification describes a circuit for producing a rectangular waveform of which the mark-to-space ratio varies to represent the first derivative with respect to time of an input signal comprising an integrator and a rectangular waveform generator or bistable circuit connected in a closed loop in which the input signal is added to the output signal of the integrator for application to the rectangular wave generator or bistable circuit. The rectangular waveform output of the circuit can be modulated by a second variable so that the modulated signal on further integration produces the integral of the second variable with respect to the variable represented by the input signal. Two such circuits may be used to produce $\int y.dx+\int x.dy=x.y$. Drift stabilisation of the circuit may be provided by a resistor connected in parallel with each integrating capacitor.

Figure 1:
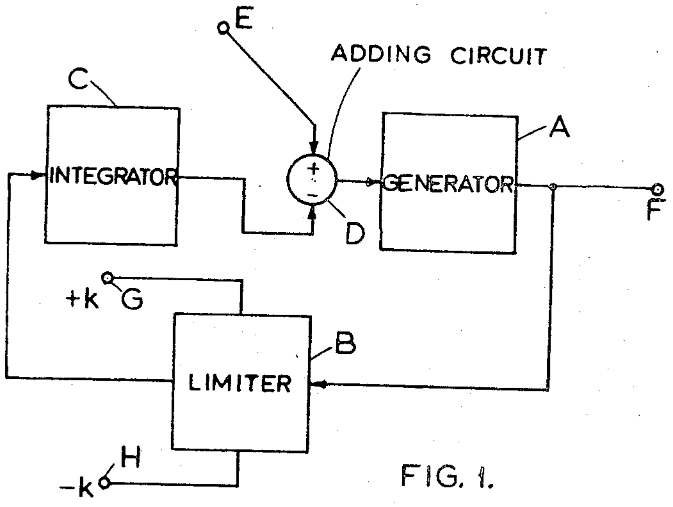

The present invention relates to circuits for manipulating a quantity which is represented by an electrical analogue signal. The invention is applicable especially to electrical analogue multipliers and integrating circuits.

In electrical analogue computers, the process of integration is performed by feeding a current representing the variable, say $y$, to be integrated to the input of an inverting amplifier which has a condenser connected between its input and output, so that at the output a voltage representing $\int y.dt+c$, the integral with respect to time of the variable is produced. In many cases, however, the integral of $y$ with respect to a variable, say $x$, other than time is required, in which case it is necessary to apply a current of $$y\cdot\frac{dx}{dt}$$

to the amplifier, so as to produce the term $$\int y\cdot\frac{dx}{dt}\cdot dt=\int y\cdot dx$$

To generate an electrical signal representing $dx/dt$ a signal $x$ may be applied to a differentiating circuit; however, such circuits as used hitherto introduce a number of practical difficulties, such as restricted bandwidth, excessive phase shifts, marginal stability, high loading of the input signal source and acute sensitivity to noise.

It is an object of the invention to provide an improved circuit for the generation of an analogue signal representing the first time differential of a quantity represented by an input signal.

According to the present invention there is provided an electrical circuit arrangement comprising input terminals for an input signal, a rectangular wave generator, an integrating circuit directly connected to receive the output waveform of said generator, and means connected to said input terminals and to said integrating circuit for adding the output of said integrating circuit to said input signal and applying the sum signal to said generator, whereby the mark-to-space ratio of the output waveform of said generator is proportional to the first derivative with respect to time of said input signal.

From an alternative aspect according to the present invention there is provided an electrical analogue integrator arrangement comprising input terminals for first and second input signals, a bistable circuit arranged to produce as output signals one or the other of two steady voltages depending on the state of the circuit, a first integrating circuit responsive to the output signal of said bistable circuit, the state of said bistable circuit being determined by the sum of the output of said first integrating circuit and said first input signal, means responsive to the output signal of said bistable circuit to produce a rectangular wave of amplitude determined by said second input signal, and a second integrating circuit responsive to said rectangular wave to produce a signal representing the integral of a variable represented by said second input signal with respect to a variable represented by said first input signal.

A rectangular waveform is a voltage or current waveform which assumes a first constant value for alternate intervals of time and a second constant value for the intervening intervals of time. The mark-to-space ratio of such a waveform is the ratio of the length of the alternate intervals to the length of the intervening intervals.

Figure 2:
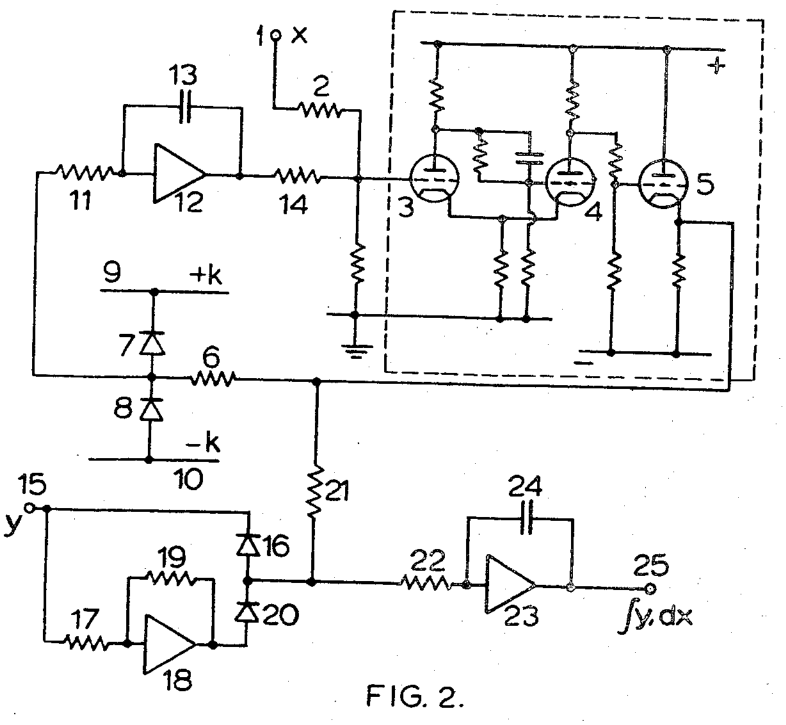
Figure 3:
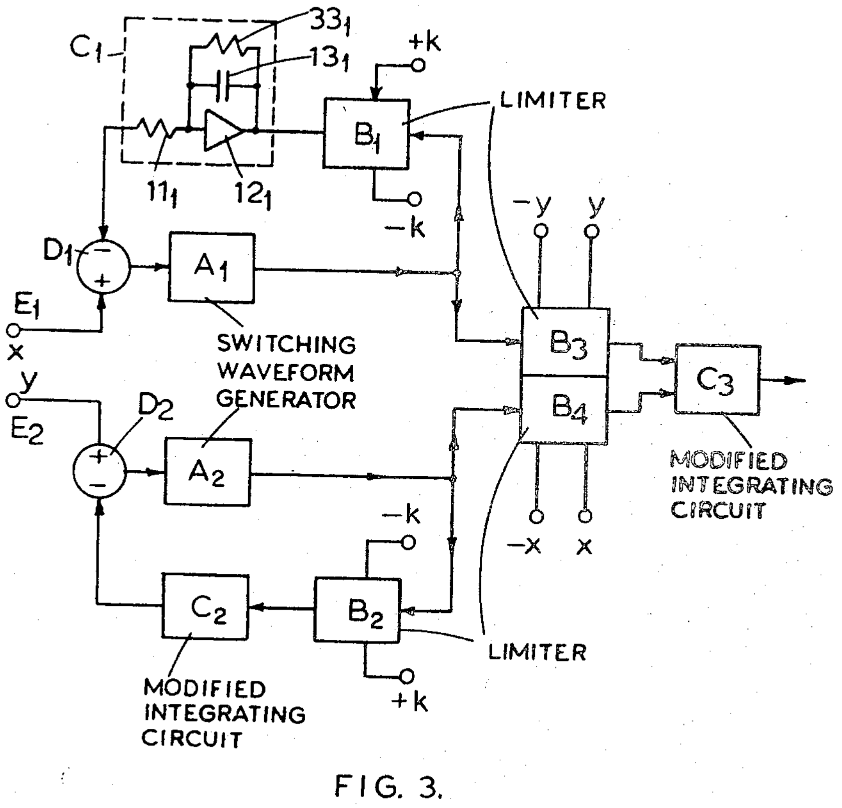

In order that the invention may be fully understood and readily carried into effect it will now be described with reference to the accompanying drawings, of which:

FIGURE 1 is a block diagram of a differentiating circuit arrangement of one example of the invention, FIGURE 2 shows in diagrammatic form a generalised integrator according to another example of the invention, applied to produce a generalised integrator, and FIGURE 3 shows in diagrammatic form an application of a differentiating circuit arrangement according to the invention to an analogue multiplying circuit.

A circuit arrangement illustrated in FIGURE 1 has the advantage that the first derivative with respect to time, is represented by a mark-to-space ratio of a rectangular waveform and not by an analogue voltage or current which explicitly represents the derivative with the result that the limitation on the range of the derivative, which would be imparted by the use of an analogue voltage or current, between noise level at one end and the maximum voltage output of the operational amplifiers at the other end, is avoided. The range limitation of the derivative is significant because on certain signals even of small amplitude, such as, for example, a step waveform, the derivative varies from zero to infinity and back to zero again.

A circuit arrangement such as illustrated in FIGURE 1 may be used in a time division multiplier arrangement to produce an output signal of the form $$y\cdot\frac{dx}{dt}$$

Such a signal may be integrated, in a conventional integrator to produce $$\int y\cdot\frac{dx}{dt}\cdot dt=\int y\cdot dx$$

A time division multiplier producing a signal of the form $$y\cdot\frac{dx}{dt}$$

coupled to an integrator which in turn provides a signal which varies according to $\int y.dx$ may be termed a generalised integrator because the integrand may be formed in respect of any variable represented here by $dx$ and not merely in respect of time.

FIGURE 1 shows a switching waveform generator A, a rectangular waveform from which is applied to a limiter B which adjusts the extremes of the waveform to $+k$ and $-k$ applied to terminals G and H. The limited waveform is then integrated in an integrator C and combined in the circuit D with the signal applied to the terminal E before application to the generator A to control the mark-to-space of the switching waveform and thus to control the mark-to-space ratio of the rectangular waveform output from B.

In accordance with the invention the loop illustrated in FIGURE 1 is such that a rectangular wave of mark-to-space ratio poportional to $$\left(1+K\frac{dx}{dt}\right)\Big/\left(1-K\frac{dx}{dt}\right)$$

where K is a constant depending on the circuit, is produced without explicit formation of $dx/dt$ as an analogue signal at the input; in this specification the mark-to-space ratio of such a rectangular wave is said to represent $dx/dt$. Thus an analogue signal representing $x$ is added to the output of the integrator C, in the adding circuit D, with the result that the mark-to-space ratio of the switching waveform generated by A represents the first derivative with respect to time of the input signal at E and not the input signal itself. The mark-to-space ratio of the rectangular waveform produced by B also represents $dx/dt$.

The limiter B may be replaced by another device producing the same result such as an electronic switch for an analogue signal which switch responds to the switching waveform to apply or not a known current or voltage to the integrator C. The switching wavefom generator A may consist of an oscillator, or oscillator and modulator, in which the input to the generator controls the mark-to-space ratio of the waveform generated. Alternatively, the generator A may be simply a bistable circuit the state of which is determined by the input signal, the bistable circuit including some hysteresis so that oscillation occurs because of the loop connection. By applying the output of the generator A to another limiter or switch like B, the limiting signal levels of which are $+y$ and $-y$, a rectangular waveform of which the mark-to-space ratio represents $dx/dt$ of which the amplitude is proportional to $y$ can be obtained, and an analogue signal proportional to $$y\cdot\frac{dx}{dt}$$

can be produced by smoothing the last mentioned rectangular waveform.

Referring now to FIGURE 2 which shows how a differentiating circuit according to FIGURE 1 may be embodied in a generalised integrator, a voltage representing $x$ is applied via the terminal 1 and resistor 2 to the input of the bistable circuit including the valves 3 and 4. The output of the bistable circuit is connected to the cathode follower valve 5 from which an output at low impedance is obtained. The output of the valve 5 is connected via resistor 6 to the junction of diodes 7 and 8. The anode of the diode 7 is connected to the cathode of the diode 8. The cathode of the diode 7 is connected to a conductor 9 maintained at a steady positive potential $+k$, i.e. a constant signal. The anode of the diode 8 is connected to a conductor 10 which is maintained at a steady negative potential $-k$, i.e. a constant signal. The junction of the diodes 7 and 8 is connected to the input of an integrator circuit consisting of an input resistor 11, an amplifier 12 and a feedback condenser 13. The output of the integrator circuit is connected via resistor 14 to the input of the bistable circuit. The components 3, 4 and 5 correspond to the switching waveform generator A of FIGURE 1 and the components 6 to 10 correspond to the limiter B. The components together may be said to constitute switching means, since they switch the signal $k$ and its negative alternately to the integrator as the integrand.

A voltage representing a second variable $y$ is applied to an input terminal 15. The terminal 15 is connected to the cathode of a diode 16, and to the input of an inverting circuit, which consists of input resistor 17, amplifier 18 and feedback resistor 19. The output of the inverting circuit is connected to the anode of a diode 20. The anode of diode 16 is connected to the cathode of diode 20. The output of the cathode follower valve 5 is connected via resistor 21, to the junction of diodes 16 and 20. The junction of diodes 16 and 20 is connected to the input of a second integrating circuit, consisting of input resistor 22, amplifier 23 and feedback condenser 24. The output of the second integrating circuit is connected to an output terminal 25. The voltage obtained at the output terminal 25 represents $$\frac{1}{k}\int y\cdot dx$$

Those skilled in the art will appreciate that the circuit arrangement shown in FIGURE 2 up to the input terminal of resistor 22 constitutes a time division multiplier in which a rectangular switching waveform having a mark-to-space ratio representing $dx/dt$ is produced by the cathode follower 5 and this switching waveform is converted into a rectangular waveform of the same wark-to-space ratio and having extreme values of $+y$ and verted into a rectangular waveform of the same mark-form so produced has a mean level representing the product $$y\cdot\frac{dx}{dt}$$

It will, however, be noticed that there is no explicit formation of an analogue signal of which the value represents the product $$y\cdot\frac{dx}{dt}$$

In addition, $dx/dt$ is not added to the input of the integrator, 11, 12, 13 the signal $x$ being added to its output. Therefore no problem in scaling a signal proportional to $dx/dt$ aises either in the case of the input signal or the output signal notwithstanding the fact that the mean level at the junction of diodes 16 and 20 repesents $$\frac{y}{k}\cdot\frac{dx}{dt}$$

The output of the second integrating circuit obtained at terminal 25 represents $$\frac{1}{k}\int y\cdot\frac{dx}{dt}\,dt=\frac{1}{k}\int y\cdot dx$$

which is the desired output.

The operation of the circuit will now be described in more detail. Suppose that the input voltage $x$ is zero, and that of the bistable circuit, the valve 3 is conducting, the valve 4 being non-conducting. Thus a large positive voltage output is obtained from the cathode follower valve 5 which is limited to a value $+k$ by the diode 7 and applied to the integrator 11, 12, 13. The output voltage of the integrator 11, 12, 13 falls at a constant rate determined by the value of $k$ and the time constant of the integrator, until a threshold value is reached at which the valve 3 becomes non-conducting and the valve 4 conducting. Now a large negative voltage output is obtained from the cathode follower valve 5, which is limited to $-k$ by the diode 8, with the result that the output voltage of the integrator 11, 12, 13 rises steadily until the valve 3 is rendered conducting again when the cycle recommences.

Since the rise and fall of the output of the integrator 11, 12, 13 both take place at the same rate and over the same voltage range, the mark-to-space ratio of the output waveform from the cathode follower valve 5 is 1:1. For any constant value of the voltage $x$, within the operating range of the circuit the mark-to-space ratio of the output waveform of the valve 5 remains at 1:1.

Suppose, however, that the voltage $x$ changes whilst the output voltage of the integrator 11, 12, 13 is rising. The change in $x$ is superimposed on the output voltage from the integrator 11, 12, 13 with the result that the corresponding mark of the waveform from valve 5 is reduced in length, for example. If a similar change in $x$ occurs whilst the output voltage of the integrator 11, 12, 13 is falling, the corresponding space of the waveform from valve 5 is increased in length. Had the change in $x$ been of opposite sign the changes in the lengths of the mark and space would have been reversed.

In the FIGURE 2 circuit, if the period of the rectangular waveform is $2p$ for constant $x$, the mark and space both having duration $p$. Now suppose $x$ is changing at a steady rate $dx/dt$ the duration of the mark becomes $$\frac{p}{1-p/2s\cdot\frac{dx}{dt}}$$

and the duration of the space becomes $$\frac{p}{1+p/2s\cdot\frac{dx}{dt}}$$

where $2s$ is the difference between the threshold values of the bistable circuit. The period of the rectangular waveform has become $$\frac{2p}{1-\left(\frac{p}{2s}\cdot\frac{dx}{dt}\right)^2}$$

and the mark-to-space ratio $$\left(1+\frac{p}{2s}\cdot\frac{dx}{dt}\right):\left(1-\frac{p}{2x}\cdot\frac{dx}{dt}\right)$$

which are the same as would be obtained with an input proportional to $dx/dt$ applied to the input of the integrator 11, 12, 13 as in a conventional time division multiplier.

The rectangular waveform from the cathode follower valve 5 is limited to extreme values of $+y$ and $-y$ by diodes 16 and 20 respectively, the resistors 17 and 19 being of equal value, and $y$ assumed to be positive. The integrator 22, 23, 24 integrates the limited rectangular waveform which has a mean level representing $$\frac{-y}{k}\cdot\frac{kx}{dt}$$

and thus produces an output voltage representing $$\frac{1}{k}\int y\cdot\frac{dx}{dt}\cdot dt=\frac{1}{k}\int y\cdot dx$$

The value of $k$ in this expression is the same as the magnitude of the voltages $+k$ and $-k$ applied to conductors 9 and 10 respectively.

Although both aspects of the invention have been described with reference to a specific embodiment, other arrangements in accordance with the invention are possible. The switching waveform generator 3, 4, 5 may comprise another form of bistable circuit, for example a phantastron or may be some other kind of circuit. The limiters 7 to 10, and 16 to 21 may also be other forms. In particular the limiter 16 to 21 may be a known kind of electronic switch capable of dealing with negative as well as positive values of $y$. Another advantage of the FIGURE 2 arrangement is that provided the limiters 7 to 10 and 16 to 21 are matched, such inaccuracies as may be introduced by them cancel out, since one is in a feedback path and the other in a forward path.

Should a signal representing $$\frac{y}{k}\cdot\frac{dx}{dt}$$

be required this may be obtained from the limiter including the diodes 16 and 20, smoothed if necessary to remove the rectangular wave component. In the arrangement shown smoothing as well as integration is achieved by the integrator 22, 23, 24.

Two generalised integrators as described above may be combined to form an analogue signal multiplier.

One method of forming a product using generalised integrators is based on the differential identity $$d(xy)\equiv ydx+xdy \qquad (1)$$

integration of which yields $$xy=\int ydx+\int xdy+C \qquad (2)$$

where C is the constant of integration.

The presence of the constant of integration ($c$) in Equation 2 however reveals the presence of two disadvantages of the basic system viz:

(1) The requirement to set in an initial condition, and (2) The presence of long term errors due to uncontrolled drift.

Both these disadvantages may be simultaneously overcome by means of a modification to the basic generalised integrator described above.

According to this modification, modified integrating circuits in which a portion of the output integral is subtracted from the integrand are employed instead of integrating circuits such as 11, 12 and 13. The differential identity characterising this drift stabilised system may be derived from the basic differential identity (1) by adding the term $2d\alpha xydt$ to each side, giving $$d(xy)+2\alpha(xy)dt\equiv y(dx+\alpha xdt)+x(dy+\alpha ydt) \qquad (3)$$

which identity is simulated by the use of modified integrating circuits such as indicated above. The stability afforded by this addition may be appreciated by considering the associated differential equation $$dz+2\alpha zdt=y(dx+\alpha xdt)+x(dy+\alpha ydt) \qquad (4)$$

in which $z$ is not necessarily equal to $xy$, the difference arising from drift error for example. Substituting from the augmented differential identity (3) yields $$dz+2\alpha zdt=d(xy)+2\alpha(xy)dt$$

or, grouping variables other than time, $$d(z-xy)+2\alpha(z-xy)dt=0$$

separating the time variable yields $$\frac{d(z-xy)}{z-xy}=-2\alpha dt$$

which on integration becomes $$\log(z-xy)=-2\alpha t+\log A$$

where log A is the constant of integration, giving $$z-xy=Ae^{-2\alpha t} \qquad (5)$$

Hence $$z\rightarrow xy(t\rightarrow\infty)$$

which is the required stabilising action. Since no restriction was placed on the initial deviation of $z$ from $xy$, this action also automatically sets the appropriate initial conditions. This technique of drift stabilisation may be applied to any use of the generalised integrator.

FIGURE 3 shows one application of the drift stabilisation technique applied to a multiplier which utilises the identity (3) above. This identity can be written $$\frac{d(xy)}{dt}+2\alpha(xy)\equiv y\left(\frac{dx}{dt}+\alpha x\right)+x\left(\frac{dy}{dt}+\alpha y\right) \qquad (6)$$

In the arrangement shown in FIGURE 3, the components $A_1$, $B_1$, $C_1$, $D_1$, $E_1$, and $A_2$, $B_2$, $C_2$, $D_2$, $E_2$, constitute two differentiating circuits similar to that illustrated in FIGURE 1 and which operate respectively on the input variables $x$ and $y$. $C_1$ and $C_2$ represent modified integrating circuits in which a portion of the output integral is subtracted from the integrand. The construction of the integrator $C_1$ is indicated and it can be seen to comprise a resistor $\mathbf{11}_1$, an amplifier $\mathbf{12}_1$, and a feedback capacitor $\mathbf{13}_1$, which correspond to the components 11, 12 and 13 shown in FIGURE 2. The modification consists in connecting a resistor $\mathbf{33}_1$ across the capacitor 13 the resistor $\mathbf{33}_1$ being dimensioned according to the chosen magnitude $\alpha$. The integrating circuit $C_2$ is similarly constructed as a third integrating circuit $C_3$ although in this latter case the feedback resistor is dimensioned according to $2\alpha$. It will be understood that the switching waveform from the generator $A_1$ has a mark-to-space ratio representing $$\left(\frac{dx}{dt}+\alpha x\right)$$

Similarly the output of the generator $A_2$ has a mark-to-space ratio representing $$\left(\frac{dy}{dt}+\alpha y\right)$$

The waveform outputs from $A_1$ and $A_2$ are applied respectively to limiters or electronic switches $B_3$ and $B_4$ of which the threshold levels are $y$ and $-y$ in the case of $B_3$ and $x$ and $-x$ in the case of $B_4$. Therefore $B_3$ produces a rectangular waveform of which the mark-to-space ratio represents $$y\left(\frac{dx}{dt}+\alpha x\right)$$

and $B_4$ produces a rectangular waveform of which the mark-to-space ratio represents $$x\left(\frac{dy}{dt}+\alpha y\right)$$

These two waveforms are added and integrated in the third integrator $C_3$ which generates an output which as can be gathered from the identity (6) and the preceding mathematical explanation is virtually $xy$ provided the integration is continued over an adequate interval.

The integrations such as required in FIGURE 3 can also be performed by simple resistance and capacity integrating circuits.

What we claim is:

1. An electrical circuit arrangement comprising input terminals for an input signal, controllable means for producing a rectangular output waveform, the positive to negative period of which defines a mark-to-space ratio, an integrating circuit directly connected to receive the output of said controllable means and means connected to said input terminals and to said integrating circuit for adding the output of said integrating circuit to said input signal and applying the sum signal to said controllable means, whereby the mark-to-space ratio of the output waveform of said controllable means represents the first derivative with respect to time of said input signal.

2. An arrangement according to claim 1 wherein said controllable means comprises a bistable trigger circuit which responds to said sum signal to change from a first state to a second state as the level of said sum signal rises past a first threshold value and to change from said second state to said first state as the level of said sum signal falls past a second threshold value.

3. An electrical analogue integrator arrangement comprising input terminals for first and second input signals, a bistable circuit arranged to produce as output signals one or other of two steady voltages depending on the state of the circuit, a first integrating circuit responsive to the output signal of said bistable circuit, the state of said bistable circuit being determined by the sum of the output of said first integrating circuit and said first input signal, means responsive to the output signal of said bistable circuit to produce a rectangular wave of amplitude determined by said second input signal, and a second integrating circuit responsive to said rectangular wave to produce a signal representing the integral of a variable represented by said second input signal with respect to a variable represented by said first input signal.

4. An electrical analogue integrator arrangement comprising input terminals for first and second input signals, controllable means for producing a rectangular output waveform, the positive to negative period of which defines a mark-to-space ratio, a first integrating circuit coupled to receive the output waveform of said controllable means, means for combining the output of said first integrating circuit and said first input signal and for applying the combination to said controllable means to control the mark-to-space ratio of the output waveform of said controllable means, means responsive to the output of said controllable means and said second input signal to produce a further rectangular wave of amplitude determined by said second input signal, and a second integrating circuit responsive to said further rectangular wave to produce an output signal which represents the integral of a variable represented by said second input signal with respect to a variable represented by said first input signal.

5. A multiplying circuit comprising first and second arrangements, each arrangement having input terminals for first and second input signals, controllable means for producing a rectangular output waveform, the positive to negative period of which defines a mark-to-space ratio, a first integrating circuit coupled to receive the output waveform of said controllable means, means for combining the output of said first integrating circuit and said first input signal and for applying the combination to said controllable means to control the mark-to-space ratio of the output waveform of said generator, means responsive to the output of said controllable means and said second input signal to produce a further rectangular wave of amplitude determined by said second input signal, the circuit also including means for applying a signal $x$ as the first input signal of said first arrangement and as the second input signal of said second arrangement, means for applying a signal $y$ as the second input signal of said first arrangement and as the first input signal of said second arrangement, and means for integrating and combining the further rectangular waves from both said first and second arrangements thereby to produce a signal representing the product of the signal $x$ and the signal $y$.

6. A circuit arrangement according to claim 5 in which the integrating circuits of both said first and second arrangements each incorporate resistive means for subtracting a portion of the output integral from the integrand.

7. A circuit according to claim 5 wherein said integrating and combining means comprises a single integrator to which the further rectangular waves from both said first and second arrangements are applied.

8. An electrical circuit arrangement comprising an integrating circuit, voltage limiting means, a two-state trigger circuit having an input circuit for an input signal, the trigger circuit being connected to said voltage limiting means so that said voltage limiting means is responsive to said trigger circuit when in a first state to apply a first signal as integrand to said integrating circuit while the input signal rises to a first threshold value and said voltage limiting means is responsive to said trigger circuit to apply the negative of said first signal as integrand to said integrating circuit while said input signal declines to a second threshold value, said first threshold value being more positive than said second threshold value, said trigger circuit being arranged to switch from one state to the other when the input signal attains the respective threshold values, and means for adding the output of said integrating circuit to a second signal to form said input signal, whereby the mark-to-space ratio of the signal applied by said voltage limiting means to said integrating circuit is caused to represent the first derivative with respect to time of said second signal.

9. An arrangement according to claim 8 wherein said first signal is a constant signal.

10. An arrangement according to claim 8 comprising a second integrating circuit and further means responsive to said trigger circuit to apply a third signal as integrand to said second integrating circuit while said trigger circuit is in said first state and to apply the negative of said third signal as integrand to said second integrating circuit while said trigger circuit is in said second state, whereby the output signal of said second integrating circuit varies according to the integral of said third signal with respect to said second signal.

References Cited

UNITED STATES PATENTS

| | | | |
|---|---|---|---|
| 2,725,191 | 11/1955 | Ham | 235—183 |
| 3,148,366 | 9/1964 | Schulz | 340—347 |
| 3,246,317 | 4/1966 | Johnson et al. | 340—347 |
| 3,264,459 | 8/1966 | Ericson | 235—183 |

MALCOLM A. MORRISON, *Primary Examiner.*

F. D. GRUBER, *Assistant Examiner.*